US008391542B2

(12) United States Patent
Avrahami (10) Patent No.: US 8,391,542 B2
(45) Date of Patent: Mar. 5, 2013

(54) METHOD FOR ESTIMATING THE POSE OF A PTZ CAMERA

(75) Inventor: Nir Avrahami, Herzliya (IL)

(73) Assignee: DVTel, Inc., Ridgefield Park, NJ (US)

( * ) Notice: Subject to any disclaimer, the term of this patent is extended or adjusted under 35 U.S.C. 154(b) by 1254 days.

(21) Appl. No.: 12/107,560

(22) Filed: Apr. 22, 2008

(65) Prior Publication Data

US 2008/0267453 A1    Oct. 30, 2008

(30) Foreign Application Priority Data

Apr. 26, 2007    (IL) .......................................... 182799

(51) Int. Cl.
*G06K 9/00* (2006.01)
*G06K 9/62* (2006.01)
*G09G 5/00* (2006.01)
*G06F 17/00* (2006.01)

(52) U.S. Cl. ........ 382/100; 345/633; 345/418; 382/157; 382/289

(58) Field of Classification Search .......... 382/291–297, 382/155–158, 100
See application file for complete search history.

(56) References Cited

U.S. PATENT DOCUMENTS

| | | | | |
|---|---|---|---|---|
| 6,157,747 A | * | 12/2000 | Szeliski et al. ................. | 382/284 |
| 6,571,024 B1 | * | 5/2003 | Sawhney et al. ............... | 382/294 |
| 6,597,818 B2 | * | 7/2003 | Kumar et al. .................. | 382/294 |
| 6,668,082 B1 | * | 12/2003 | Davison et al. ................ | 382/190 |
| 6,985,620 B2 | * | 1/2006 | Sawhney et al. ............... | 382/154 |
| 7,242,460 B2 | * | 7/2007 | Hsu et al. ....................... | 356/4.01 |
| 7,308,115 B2 | * | 12/2007 | Zhang et al. ................... | 382/107 |
| 7,313,252 B2 | * | 12/2007 | Matei et al. .................... | 382/100 |
| 2004/0184013 A1 | * | 9/2004 | Raskar et al. .................. | 353/121 |
| 2006/0008121 A1 | * | 1/2006 | Zhang et al. ................... | 382/107 |
| 2006/0256200 A1 | * | 11/2006 | Matei et al. .............. | 348/208.14 |
| 2007/0253618 A1 | * | 11/2007 | Kim et al. ...................... | 382/154 |

* cited by examiner

*Primary Examiner* — Chan S Park
*Assistant Examiner* — Avinash J Yentrapati
(74) *Attorney, Agent, or Firm* — Pearl Cohen Zedek Latzer, LLP (57) ABSTRACT

Provided is an iterative method of estimating the pose of a moving PTZ camera. The first step is to use an image registration method on a reference image and a current image to calculate a matrix that estimates the motion of sets of points corresponding to the same object in both images. Information about the absolute camera pose, embedded in the matrix obtained in the first step, is used to simultaneously recalculate both the starting positions in the reference image and the motion estimate. The recalculated starting positions and motion estimate are used to determine the pose of the camera in the current image. The current image is taken as a new reference image, a new current image is selected and the process is repeated in order to determine the pose of the camera in the new current image. The entire process is repeated until the camera stops moving.

8 Claims, 7 Drawing Sheets

METHOD FOR ESTIMATING THE POSE OF A PTZ CAMERA

CROSS REFERENCE TO RELATED APPLICATIONS

This application claims priority from Israel Patent Application No. 182799, filed on Apr. 26, 2007, entitled "A METHOD FOR ESTIMATING THE POSE OF A PTZ CAMERA".

FIELD OF THE INVENTION

The present invention is related to the field of video surveillance. In particular the invention relates to automatic tracking with a PTZ (pan-tilt-zoom) camera. More specifically, the invention relates to methods of estimating the pose of a PTZ camera.

BACKGROUND OF THE INVENTION

In this application the following definitions are used:
The position of camera is its location in some three-dimensional coordinate system, typically the location on the surface of the earth and the elevation.
The pose of a camera is its three dimensional orientation with respect to the target it is imaging. The pose is measured in terms of a pan angle and a tilt angle, which define the direction of the straight line from the scene center, and the zoom, which is related to the field of view.
A target is an object, for example a vehicle or person, being tracked by a PTZ camera.

When using a PTZ camera in a surveillance system to automatically track a target it is necessary to know the pose of the camera at all times in order for the system to be able to generate the most appropriate motion commands that control the camera's motion. For example: viewing an object advancing in the image to the right may mean at one configuration giving only a pan command, while in another configuration a tilt command would also be necessary.

When working with cameras mounted on moving platforms, both position and pose must be determined; however for fixed PTZ surveillance cameras, only the pose need be determined. For fixed PTZ surveillance cameras there are two cases to consider:
The PTZ camera does not support feedback and hence the pose must be calculated entirely.
The PTZ camera supports feedback (sending its pose over a communication wire). In this case, for reasons that will be discussed hereinbelow, the feedback is limited and hence in this case also, the algorithm needs to refine the pose as given by the feedback to estimate the exact pose of the camera in each frame.

Many different methods are known in the prior art for determining the position and pose of cameras. The most common methods for determining pose begin by identifying a fixed reference mark or object in one of the frames of video images captured by the camera. The selected frame is referred to as the reference frame. The pose of the camera when taking the reference frame is measured or assigned arbitrary values. The same object is then located in the next frame (referred to as the current frame) and image processing techniques are used to calculate the motion of the object from the reference frame to the current frame. It is to be noted that the reference object does not move from frame to frame, but there is apparent motion caused by the motion of the camera. The calculated motion is used to estimate the pose of the camera when taking the current frame relative to the pose in the reference frame. An iterative process is now carried out in which the current frame is made the "reference" frame and a new "current" frame is selected. The motion of the object between the new reference and current frames is determined and used to calculate the pose of the camera when taking the new current frame. The process is continued on a frame by frame basis until the camera ceases tracking the target.

The major difficulty with this method is that any image motion estimation algorithm inherently contains some error. This error is added to the error of previous iterations and accumulates when repeating the procedure. Consequently, after a short while of tracking, the resulting pose estimation is very erroneous. The tracking quality degrades and even may fail, since the actual result of given tracking commands is different from the expected result.

In addition to the above source of accumulative error, cameras that support feedback suffer from a feedback limitation, which results from various factors including:
The feedback relies upon a mechanical gear, whose accuracy is limited by the number of teeth and the way the sensors pass on the information about the rotation of the gear to the user/client.
There are inaccuracies in the manufacturing and assembly of the gears/motors.
There might be backlash effects.
The mechanics of the camera and its PT platform are subject to temperature changes.
The feedback has a non-constant latency due to communication constraints, hence when the algorithm receives feedback information it is no longer valid.

The conclusion that can be reached from this is that a good pose estimation algorithm with no accumulative error must be developed.

It is therefore a purpose of the present invention to provide a method for determining PTZ pose estimations which improves upon prior art methods by eliminating the accumulative error.

Further purposes and advantages of this invention will appear as the description proceeds.

SUMMARY OF THE INVENTION

The invention is an iterative method of estimating the pose of a PTZ camera while it is moving. The method comprises the steps of:
(a) Using an image registration method on a reference image and a current image to calculate a matrix that estimates the motion of sets of points corresponding to the same object in the reference image and the current image.

The iterative method is characterized by the following additional steps:
(b) Using information about the absolute camera pose, embedded in the matrix to simultaneously recalculate both the starting positions in the reference image and the motion estimate.
(c) Using the recalculated starting positions and the recalculated motion estimate to determine the pose of the camera in the current image.
(d) Taking the current image as a new reference image, selecting a new current image and repeating steps (a) to (c) to determine the pose of the camera in the new current image.
(e) Repeating step (d) until the camera stops moving.

In the first step of the iterative process of the method of the invention, the information about the absolute camera pose can comprise either an estimate or randomly chosen values of the parameters of the absolute camera pose.

In embodiments of the method of the invention, the moving PTZ camera can be tracking an object.

According to the method of the invention, the starting positions in the reference image and the motion estimate can be recalculated by finding the best 5-tuple of parameters approximating the matrix calculated using the image registration method. In one embodiment the best 5-tuple of parameters are found by minimizing an equation that comprises a homographies distance function, a tilt distance function, and a zoom distance function. The tilt distance function and the zoom distance function can be multiplied by weights that respectively signify the confidence in the new image motion estimation compared to the previous estimation of the tilt and zoom values.

According to one embodiment of the method of the invention the minimization of the equation is implemented by enumeration over the entire search range, using a coarse-to-fine approach. According to another embodiment a gradient-descent minimization technique, which can be either a Gauss-Newton technique or an LM technique is employed.

All the above and other characteristics and advantages of the invention will be further understood through the following illustrative and non-limitative description of preferred embodiments thereof, with reference to the appended drawings.

DETAILED DESCRIPTION OF PREFERRED EMBODIMENTS

The first steps of the method of the invention are similar to those used in the art for determining the pose of a PTZ camera. Reference points are selected in the first (reference) frame and located in the second (current) frame. A matrix is then determined that explains the motion of the reference points from the first to the second frame. This matrix has two deficiencies. Firstly it is influenced by "noise" caused by the difficulty of exactly identifying the location of the reference points in the neighboring frames and secondly not all 3×3 matrices describe "legal" motions of the camera. As a result, when this matrix is used in the prior art to determine the pose of the camera in the $2^{nd}$ frame, an error occurs and these errors accumulate as the calculated pose of the $2^{nd}$ frame is used as the basis of the calculation of the pose of the $3^{rd}$ frame, etc.

The method of the invention now deviates from the prior art by determining a legal matrix, which contains the combination of parameters that best approximates the original matrix. The method of the invention simultaneously recalculates the starting position of the $1^{st}$ frame and the motion estimate to the $2^{nd}$ frame to determine the pose of the camera in the $2^{nd}$ frame. As a result the error is reduced and under normal conditions does not tend to accumulate.

Figure 1A:
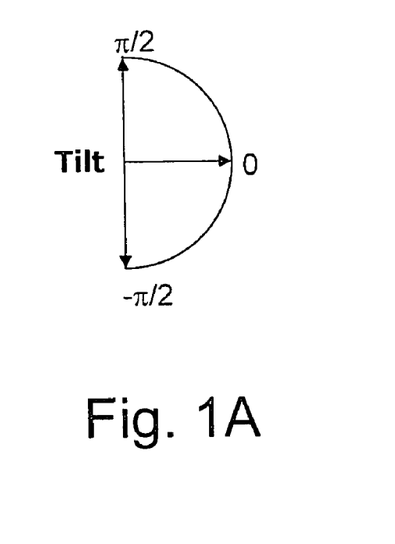
FIGS. 1A and 1B show the 3D local camera coordinate system used to mathematically describe the invention.
Figure 1B:
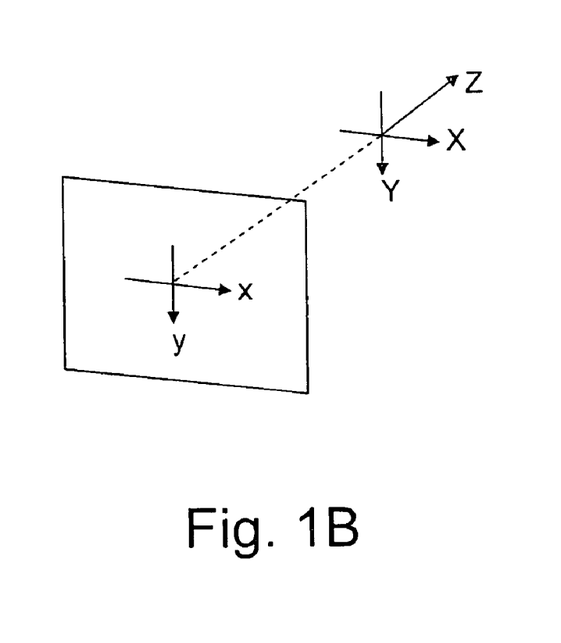

FIGS. 1A and 1B show the 3D local camera coordinate system used to mathematically describe the invention. Tilt=$\pi/2$ represents a camera facing up, while Tilt=$-\pi/2$ represents the camera facing down. In order to simplify the formulation, it is assumed that the pixel coordinate (0,0) is located at the center of an image and not at the top left of the image as is conventional in the art.

It is well known that the transformation between two images sharing the same optical center is a homography, i.e. a 3 by 3 matrix. The following discussion is based on the assumption that there are given two images $I_1$ and $I_2$, with corresponding poses: $pose_1=(Pan_1,Tilt_1,Zoom_1)$ and $pose_2=(pose_1+dpose)=(Pan_1+dPan,Tilt_1+dTilt,Zoom_1+dZoom)$. It is also assumed that an image registration algorithm is applied to the images. The resulting homography is denoted by $H_{calc}$. It is to be noted that there are various image registration algorithms/techniques known to skilled persons that are suitable to use with the method of the invention. Since the invention is not sensitive to the image registration algorithm used, these will not be discussed herein.

Now an accurate formulation of the image points' motion will be presented. Assume two sets of points that correspond to the same object in two consecutive frames are given. Let $p_i$ represent a few image points in view 1 (Image $I_1$), and let $q_i$ represent the corresponding points in view 2 (Image $I_2$). All of the points are in homogeneous form (i.e., the point (x,y) is represented by (x,y,1)), then:

$$\forall i H \cdot p_i \cong q_i \qquad (1)$$

Where $\cong$ means equality up to a scale, and:

$$H=H(Tilt,Zoom,dPan,dTilt,dZoom)=M_2 \cdot R_{dTilt} \cdot (R_{Tilt} \cdot R_{dPan} \cdot R_{Tilt}^t) \cdot M_1^{-1} \qquad (2)$$

In equation (2):
$M_2$=the projection matrix for view 2 with Zoom+dZoom
$R_{dTilt}$=the rotation matrix due to change in tilt
$R_{Tilt}$=the rotation matrix due to the camera tilt
$R_{dPan}$=the rotation matrix due to change in pan
$M_1$=the projection matrix for view 1 with Zoom
These matrices are explicitly written as:

$$M_1 = \begin{pmatrix} Zoom & & \\ & Zoom & \\ & & 1 \end{pmatrix}, \qquad (3)$$

$$M_2 = \begin{pmatrix} Zoom+dZoom & & \\ & Zoom+dZoom & \\ & & 1 \end{pmatrix}$$

$$R_{Tilt} = \begin{pmatrix} 1 & & \\ & \cos(Tilt) & \sin(Tilt) \\ & -\sin(Tilt) & \cos(Tilt) \end{pmatrix}, \qquad (4)$$

$$R_{dTilt} = \begin{pmatrix} 1 & & \\ & \cos(dTilt) & \sin(dTilt) \\ & -\sin(dTilt) & \cos(dTilt) \end{pmatrix}$$

$$R_{dPan} = \begin{pmatrix} \cos(dPan) & & -\sin(dPan) \\ & 1 & \\ \sin(dPan) & & \cos(dPan) \end{pmatrix} \qquad (5)$$

Figure 2:
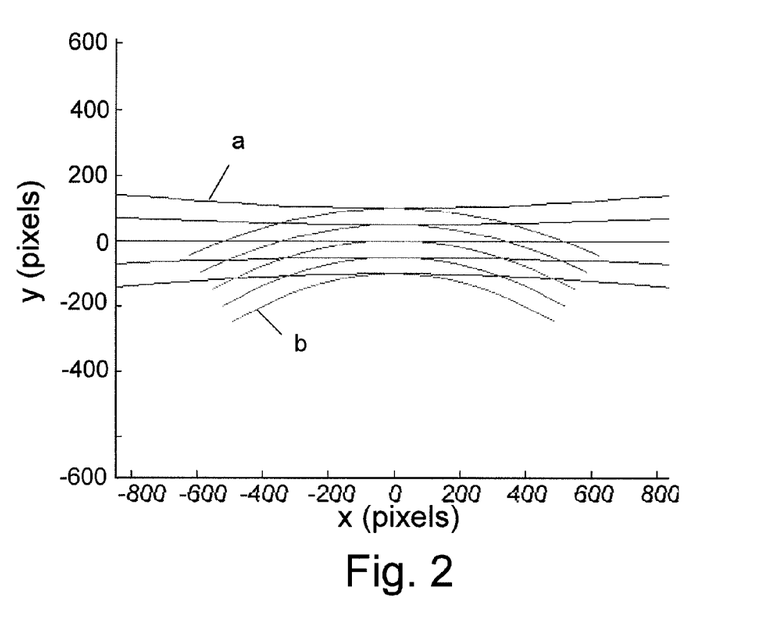
FIG. 2 shows the image motion due to camera panning of a few fixed world points for two different camera tilt values.
Figure 3:
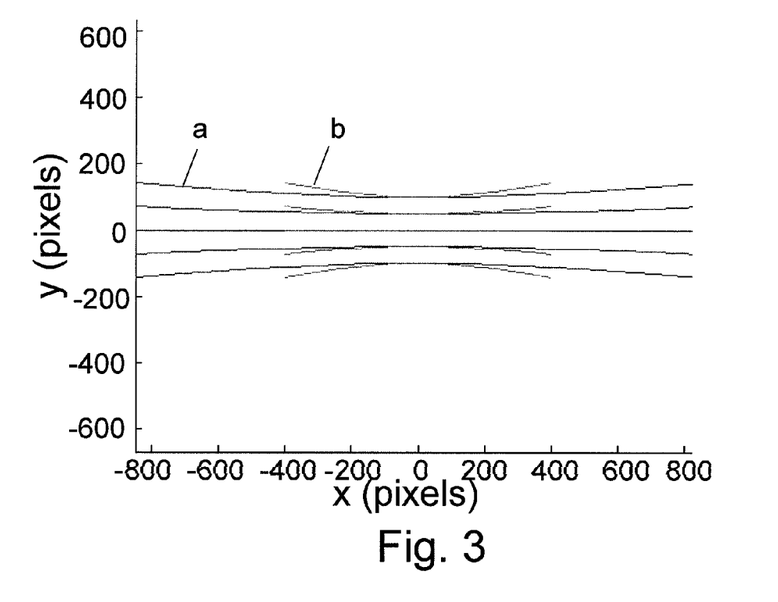
FIG. 3 shows the image motion due to camera panning of a few fixed world points for two different camera zoom values.

Consider now FIG. 2 that shows the image motion of five fixed world points when panning a camera from −45 degrees to +45 degrees for two different camera tilt values, 0 degrees (curves a) and 40 degrees (curves b). In FIG. 2, the camera has a fixed zoom=848. FIG. 3 shows the image motion of five fixed world points when panning the same camera from −45 degrees to +45 degrees for two different camera zoom values, zoom=848 (curves a) and zoom=400 (curves b). In FIG. 3 the camera has a fixed tilt=0 degrees. The nonlinearity of the curves shows that the same pan command yields different image motion for different tilt or zoom) values, i.e. FIG. 2 and FIG. 3 show that the image motion contains information about the absolute pose of the camera and not just information that is relative to a reference frame.

The present invention exploits the information about the absolute camera pose that is embedded in the calculated motion by deducing a better estimation of the starting position $pose_1$ as well as ($pose_1$+dpose) from the calculated motion. The method of the invention now requires finding the best 5-tuple of parameters approximating the calculated homography $H_{calc}$ calculated by the image registration module. This is actually a projection of the calculated homography on the manifold of valid PTZ homographies. In order to consider the previous pose estimation (i.e., $Pan_1$, $Tilt_1$, and $Zoom_1$), two additional weighted error terms are added, i.e., the following equation is solved:

$$\underset{\{Tilt,Zoom,dPan,\atop dTilt,dZoom\}}{\mathrm{argmin}} \begin{pmatrix} distH(H(Tilt, Zoom, dPan, dTilt, dZoom)H_{calc})^2 + \\ \lambda_{Tilt} \cdot distTilt(Tilt, Tilt_1, Zoom)^2 + \\ \lambda_{Zoom} \cdot distZoom(Zoom, Zoom_1)^2 \end{pmatrix} \quad (6)$$

The inputs to equation (6) are the current camera pose estimation and the motion estimate. The equation is solved to simultaneous find the starting positions and the motion, subject to the condition that the calculated starting positions be as close as possible to the "known" starting positions.

The following observations are made with reference to equation (6):

- 'Pan' is not present in equation (6) because it does not affect the possible image motions, therefore it cannot be deduced. On the other hand, error in it, does not affect the tracking quality. Therefore, assuming the motion estimation algorithm is unbiased and using the fact that the error in the Pan estimation has no effect on consecutive motion estimations, we can deduce that the dPan errors are independent and hence their sum is still unbiased, though with larger variance.
- 'Pan' motion is informative with regard to the 'Tilt' and 'Zoom' values, 'Tilt' motion is informative with regard to the 'Zoom' value, and finally 'Zoom' motion does not contain information at all about other values.
- The minimization of equation (6) can be implemented in various ways, among which are:
  - Enumeration over the entire search range, with a coarse-to-fine approach. Note that though the search range is huge, each score computation is negligible, which makes this approach feasible.
  - Employing one of the gradient-descent minimizations techniques, e.g. Gauss-Newton, LM, etc. This can serve as a complementary step to an enumeration stage, hence avoiding both rough solution and local minimum. Note that using the previous Pose estimation with the same motion estimation as the last frame or no movement estimation will probably be a very good point for such an optimization.
- $\lambda_{Tilt}$ and $\lambda_{Zoom}$ are positive weights signifying the confidence in the new image motion estimation compared to the previous estimation of the tilt and zoom values. For example, if the camera sends feedback regarding its pose, while it is stationary, then the confidence in this initial pose is high. On the other hand, tracking an object in low contrast area lowers the confidence in the estimation, while tracking in high contrast/texture area raises the confidence.

The top line in equation (6) is a homographies distance function. An example of a reasonable choice for the homographies metric is:

$$distH(H_{cur}, H_{ref}) = \sqrt{\frac{1}{n}\sum_{i=1}^{n} \|\lfloor H_{cur} \cdot corner_i \rfloor - \lfloor H_{ref} \cdot corner_i \rfloor\|^2} \quad (7)$$

Where $\lfloor H \cdot corner_i \rfloor$ marks the normalized homogenic point (last coordinate equals 1) and $corner_i$ denote the $i^{th}$ corner of the region of interest, which can be either only apart of or the entire image. Typically, the region of interest is either a square or a rectangle and i=1 . . . 4. The choice of equation (7) for the homographies metric to be used in solving equation (6) insures that a valid homography affecting the image points in the most similar manner to the calculated homography, rather than homography with the most similar coefficients, is obtained. It is noted that the distance function units are pixels.

The bottom line of equation (6) is the distance function, which insures that the calculated (improved) starting point is not to far from the original (given) starting point. The distance function is divided into two terms, the first for the tilt and the second for the zoom.

The tilt distance function is determined by measuring the distance between two tilt values with the same units as the other terms (i.e. in pixels) in order to achieve the same behavior in all camera poses, hence the angle value must be translated into pixels. The translation is carried out using the zoom value in the camera pose to express the approximate distance a point in the reference image moves due to the change in tilt. Equations (8.1) and (8.2) are two examples of the several ways in which this can be done.

The direct translation is:

$$distTilt(Tilt_{cur}, Tilt_{ref}, Zoom_{ref}) = \tan(|Tilt_{cur} - Tilt_{ref}|) \cdot Zoom_{ref} \quad (8.1)$$

A more stable translation can be achieved using:

$$distTilt(Tilt_{cur}, Tilt_{ref}, Zoom_{ref}) = 2 \cdot \sin(0.5 \cdot |Tilt_{cur} - Tilt_{ref}|) \cdot Zoom_{ref} \quad (8.2)$$

The zoom distance function is calculated in the following way: Since the zoom agrees with $$\frac{X}{Z} = \frac{x}{Zoom}$$

for a world point (X,Y,Z) given in the camera's coordinate system, the change in the location of a point in the reference image due to change in zoom can be described as:

$$\Delta x = \Delta Zoom \cdot \frac{X}{Z}, \Delta y = \Delta Zoom \cdot \frac{Y}{Z}.$$

The maximum movement of an image point is $$\max \Delta pt = \max \sqrt{\Delta x^2 + \Delta y^2}$$

-continued $$= \max_{(X,Y,Z)} \left( \Delta Zoom \cdot \frac{\sqrt{X^2+Y^2}}{Z} \right)$$

$$= \Delta Zoom \cdot \frac{\sqrt{\left(\frac{imgWidth}{2}\right)^2 + \left(\frac{imgHeight}{2}\right)^2}}{Zoom}$$

$$= \frac{\Delta Zoom}{Zoom} \cdot \frac{imgDiagonal}{2}$$

Since the width, height, and diagonal, measurements of the image (imgWidth, imgHeight, and imgDiagonal respectively) are given in pixel unit to begin with, it is only natural to define the distance as:

$$distZoom(Zoom_{cur}, Zoom_{ref}) = \frac{|Zoom_{cur} - Zoom_{ref}|}{Zoom_{ref}} \cdot \frac{imgDiagonal}{2} \quad (9)$$

Using the above, i.e. equations (7), (8.2), and (9), equation (6) is now solved and the new pose, i.e. the pose of the camera in the second frame, is estimated using both the camera motion estimation and the corrected pose parameters for the reference frame, i.e. Tilt rather than $Tilt_1$, and Zoom rather than $Zoom_1$, but still using $Pan_1$, for the previous view, i.e. the first frame. The result is the pose update rule:

$$\begin{pmatrix} Pan_2 \\ Tilt_2 \\ Zoom_2 \end{pmatrix} = \begin{pmatrix} Pan_1 \\ Tilt \\ Zoom \end{pmatrix} + \begin{pmatrix} dPan \\ dTilt \\ dZoom \end{pmatrix} \quad (10)$$

It is to be noted that the invention is not limited by the specific equations given above. These specific equations are given only to illustrate the basic principals of the invention. Persons of the art will be able to formulate alternative mathematical approaches that will lead to the same result. As a particular example, equations (8.1) or (8.2) and (9) can be replaced by a single function that can be used as the distance function in equation (6).

$Pan_2$, $Tilt_2$, and $Zoom_2$ now are taken as the pose of the "first" frame and the method is repeated to find the motion between it and the next frame, etc.

Figure 4:
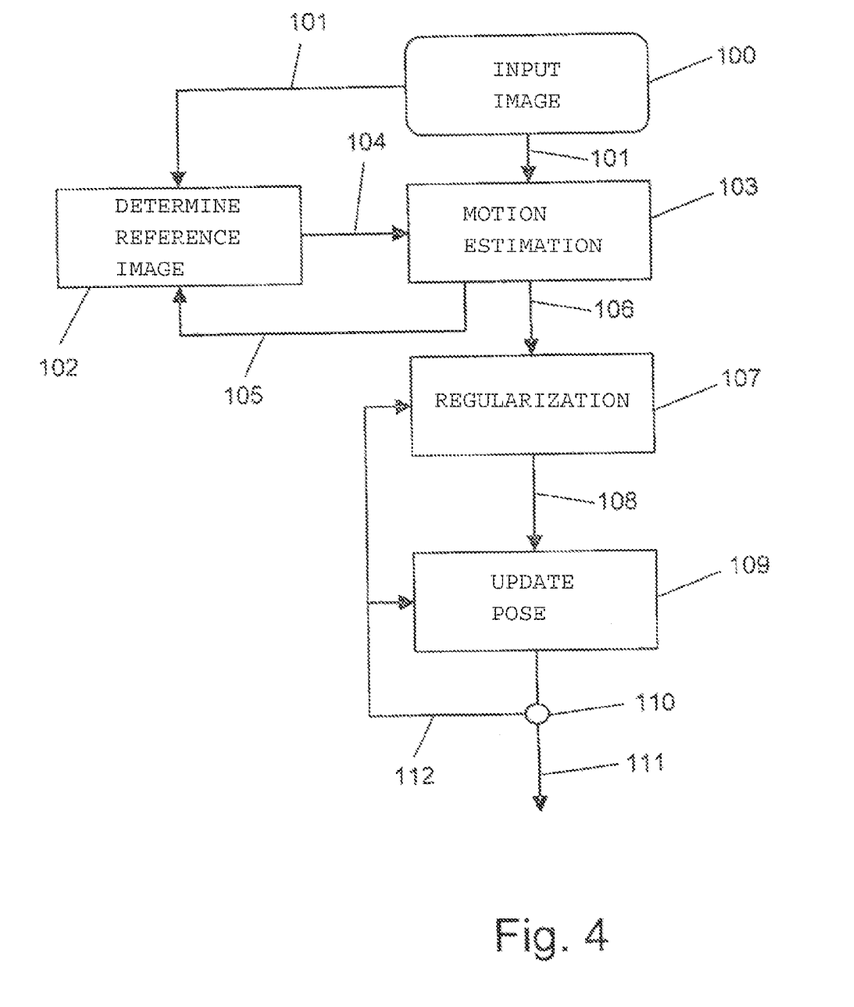
FIG. 4 is a flow chart, which schematically summarizes the method of the invention.

FIG. 4 is a flow chart, which schematically summarizes the method of the invention. Block 100 represents the current image that is input into the system. Arrows 101 show that the new image is transferred to block 102, which represents the collection of all the previous images recorded by the camera in the particular surveillance sequence and also to block 103 which represents the image registration algorithm and motion estimate calculations. One of the images previously added to block 102 is selected as the reference image, which is also transferred (arrow 104) into block 103. The output of block 103 is the motion estimation expressed as homography $H_{calc}$. Other information, such as the maximum motion between the two images, that is also determined in block 103 is transferred (arrow 105) into block 102 and used to help in the choice of the most suitable reference frame.

The motion estimation $H_{calc}$ is the input 106 into block 107, which represents the regularization process. In this process equation (6) is optimized to yield the best 5-tuple of the parameters {Tilt, Zoom, dPan, dTilt, dZoom} (collectively represented by arrow 108) that approximate $H_{calc}$. Parameters 108 are then input into equation (10) in block 109. The output of block 109, represented by circle 110, is the updated values of the POSE, i.e. {Pan, Tilt, Zoom} for the image input into block 100. Result 110 is transferred (arrow 111) to an external observer and also (arrow 112) back into blocks 107 and 109 where it is part of the input for the next set of calculations to be carried out when the next image is input into block 100.

Simulation:

In order to test the method of the invention, a numerical simulation of a stationary PTZ camera that undergoes panning, tilting and zooming motions was implemented in Matlab. A few scenarios were tested, each of them twice, once starting with an exact estimation of the Pose and then starting with an erroneous estimation of the POSE.

Figure 5:
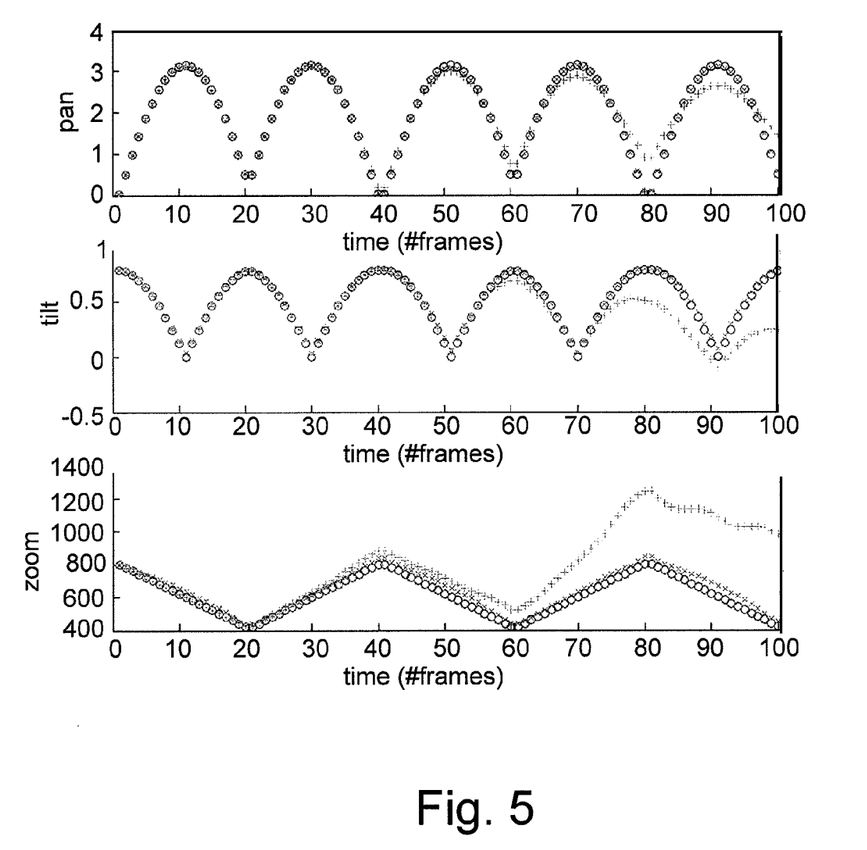
FIG. 5 to FIG. 8 show the results of a numerical simulation of a camera that undergoes panning, tilting and zooming motions.
Figure 6:
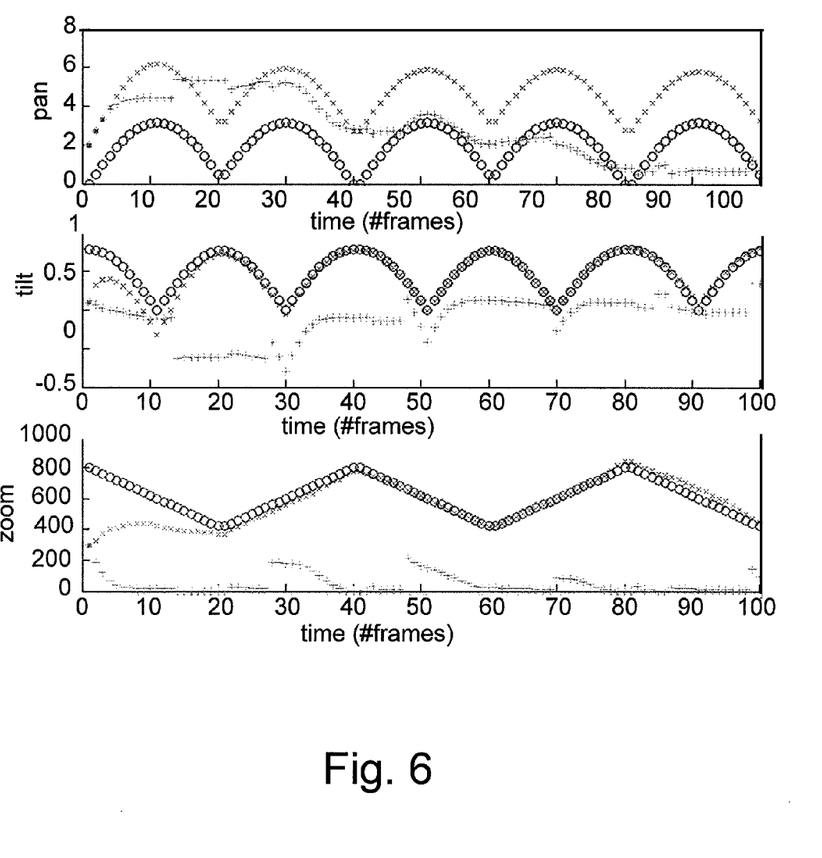
Figure 7:
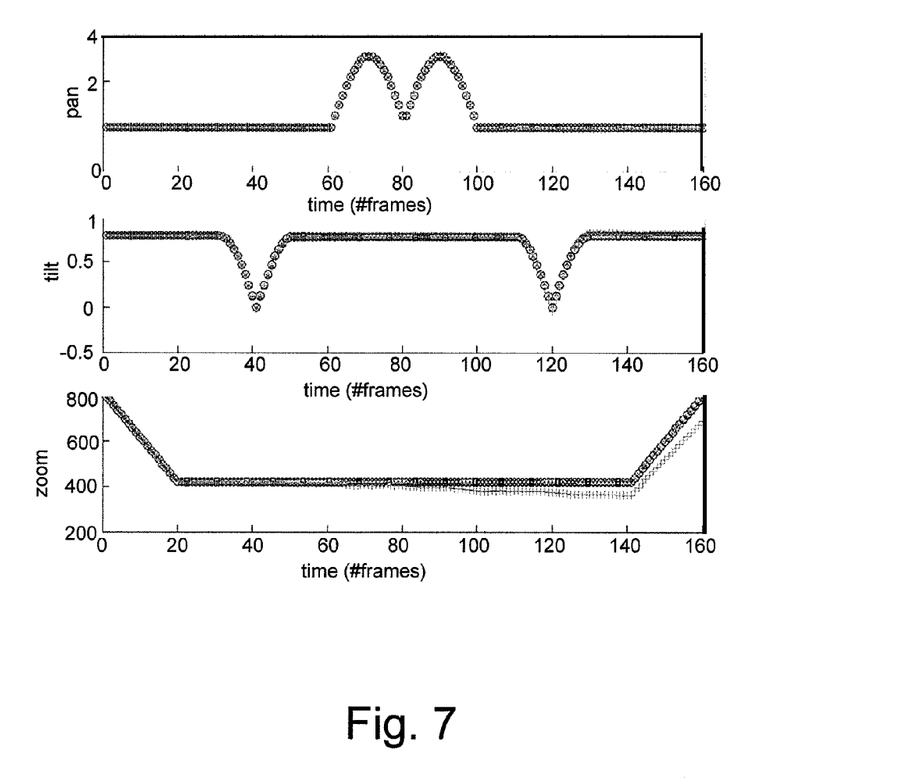
Figure 8:
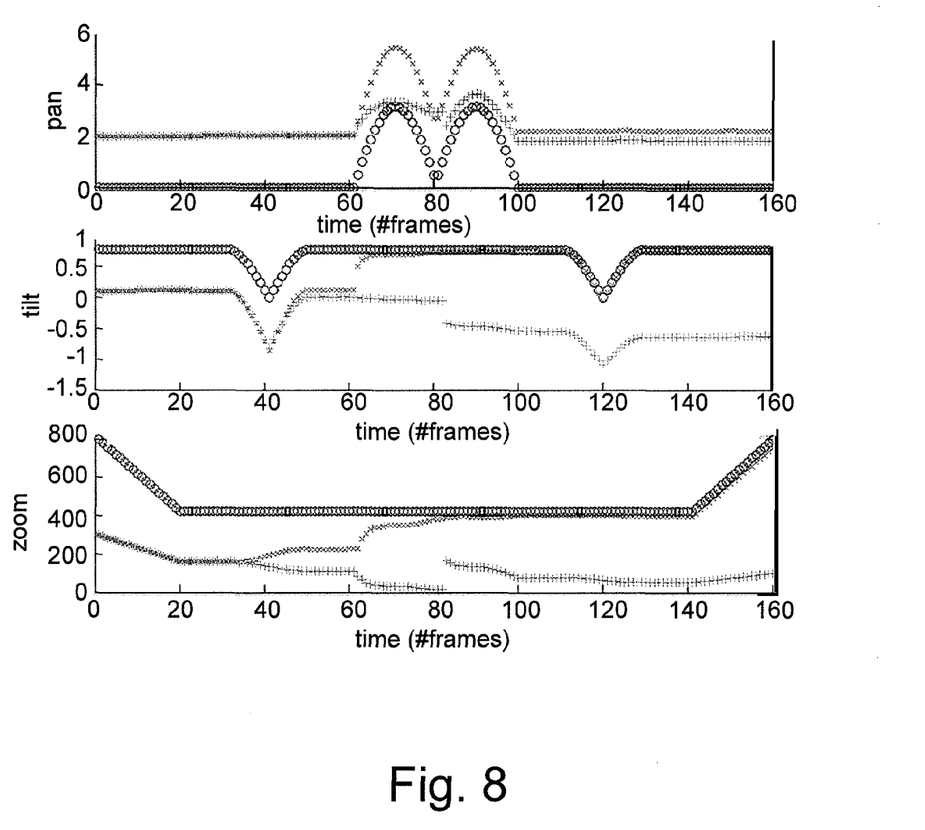

The results for one of the scenarios are shown graphically in FIG. 5 and FIG. 6 and the results for a second scenario are shown in FIG. 7 and FIG. 8.

The true motion of the camera (the ground truth) is depicted by open circles (o) in the graphs. For each frame a registration algorithm was used to calculate a homography $H_{calc}$ based on noisy points correspondence (with $\sigma=0.25$ pixels in each axis). For this task, the 4 corners of a region of interest containing most of the image were chosen.

Two methods were compared to the true motion:

A standard method, which computes the motion ($\Delta Pan$, $\Delta Tilt$, $\Delta Zoom$), then integrates it to get the camera pose. The results obtained using this method are depicted by plus signs (+) in the graphs.

The method of the invention, described herein with $\lambda_{Tilt}=\lambda_{Zoom}=0.1$. The results obtained using this method are depicted by x's (x) in the graphs.

The simulation results can be summarized as follows for both scenarios:

When the exact starting POSE is known (FIG. 5 and FIG. 7), the method of the invention follow the ground truth quite closely and does not drift as does the standard method. The graphs of the standard method drift totally away from the ground truth after about 40 frames.

Although the pan is not explicitly improved according to the above analysis, the results obtained using the method of the invention are still much better than the standard method and moreover do not drift.

When the exact starting POSE is not known (FIG. 6 and FIG. 8), the method of the invention converges to the real tilt and zoom rather quickly, while the pan remains approximately within a constant deviation from its real value (but this has no physical importance). On the other hand, under these conditions the standard method very quickly "gets lost" and never approximates the ground truth.

Although embodiments of the invention have been described by way of illustration, it will be understood that the invention may be carried out with many variations, modifications, and adaptations, without exceeding the scope of the claims.

The invention claimed is:

1. An iterative method of estimating the pose of a PTZ camera while it is moving, said method comprising:
  (a) using an image registration method on a reference image and a current image to calculate a matrix that estimates the motion of sets of points corresponding to the same object in said reference image and said current image;
  said iterative method characterized by the following additional steps:
  (b) using information about the absolute camera pose, embedded in said matrix to simultaneously recalculate both the starting positions in said reference image and said motion estimate, wherein the information about the absolute camera pose comprises randomly chosen values of the parameters of said absolute camera pose;
(c) using said recalculated starting positions and said recalculated motion estimate to determine the pose of said camera in said current image;
(d) taking said current image as a new reference image, selecting a new current image and repeating steps (a) to (c) to determine the pose of said camera in said new current image; and
(e) repeating step (d) until said camera stops moving.

2. The method of claim 1, wherein the starting positions in the reference image and the motion estimate are recalculated by finding the best 5-tuple of parameters approximating the matrix calculated using the image registration method.

3. The method of claim 2, wherein the best 5-tuple of parameters are found by minimizing an equation that comprises a homographies distance function, a tilt distance function, and a zoom distance function.

4. The method of claim 3, wherein the tilt distance function and the zoom distance function are multiplied by weights that respectively signify the confidence in the new image motion estimation compared to the previous estimation of the tilt and zoom values.

5. The method of claim 3, wherein the minimization of the equation is implemented by enumeration over the entire search range, using a coarse-to-fine approach.

6. The method of claim 3, wherein the minimization of the equation is implemented by employing a gradient-descent minimization technique.

7. The method of claim 6, wherein the gradient-descent minimization technique is either a Gauss-Newton technique or an LM technique.

8. The method of claim 1, wherein the moving PTZ camera is tracking an object.

* * * * *